US012398657B2

(12) United States Patent
Digeos et al.

(10) Patent No.: US 12,398,657 B2
(45) Date of Patent: Aug. 26, 2025

(54) AIR INTAKE LIP FOR A NACELLE OF AN AIRCRAFT PROPULSION ASSEMBLY

(71) Applicant: SAFRAN NACELLES, Gonfreville-l'Orcher (FR)

(72) Inventors: Virginie Emmanuelle Anne-Marie Digeos, Moissy-Cramayel (FR); Caroline Coat-Lenzotti, Moissy-Cramayel (FR); Thierry Jacques Albert Le Docte, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 0 days.

(21) Appl. No.: 18/719,046

(22) PCT Filed: Dec. 15, 2022

(86) PCT No.: PCT/FR2022/052378
§ 371 (c)(1),
(2) Date: Jun. 12, 2024

(87) PCT Pub. No.: WO2023/111469
PCT Pub. Date: Jun. 22, 2023

(65) Prior Publication Data
US 2025/0067196 A1 Feb. 27, 2025

(30) Foreign Application Priority Data

Dec. 17, 2021 (FR) ........................ 2113772

(51) Int. Cl.
*F01D 25/02* (2006.01)
*F01D 25/10* (2006.01)
*F01D 25/24* (2006.01)

(52) U.S. Cl.
CPC ............. *F01D 25/02* (2013.01); *F01D 25/10* (2013.01); *F01D 25/24* (2013.01);
(Continued)

(58) Field of Classification Search
CPC ...................................... F01D 25/02
See application file for complete search history.

(56) References Cited

U.S. PATENT DOCUMENTS 6,122,892 A    9/2000  Gonidec et al.
8,584,363 B2 * 11/2013  Caruel ................... H05B 3/267
                                                            244/1 N
(Continued)

FOREIGN PATENT DOCUMENTS

CN    113562182 A  * 10/2021
FR        2752392 A1     2/1998
(Continued)

OTHER PUBLICATIONS

"Thermophysical properties of graphene-based nanofluids". Khaled Elsaid. Elsevier. International Journal of Thermofluids 10 (2021) 100073. Feb. 2021 (Year: 2021).*
(Continued)

*Primary Examiner* — Courtney D Heinle
*Assistant Examiner* — John S Hunter, Jr.
(74) *Attorney, Agent, or Firm* — CHRISTENSEHN O'CONNOR JOHNSON KINDNESS PLLC

(57) ABSTRACT

An annular air intake lip for a nacelle of an aircraft propulsion assembly is provided. The annular lip can extend about an axis of revolution and include: an external annular wall, an internal annular wall, an upstream annular wall connecting the external and internal annular walls to define an annular cavity therebetween. At least part of the annular lip can include at least one heat transfer coating that is made from a carbon allotrope material.

20 Claims, 5 Drawing Sheets

(52) U.S. Cl.
CPC .... *F05D 2220/323* (2013.01); *F05D 2230/31* (2013.01); *F05D 2260/221* (2013.01); *F05D 2260/963* (2013.01)

(56) References Cited

U.S. PATENT DOCUMENTS

| | | | |
|---|---|---|---|
| 9,390,704 | B2 | 7/2016 | Hurlin et al. |
| 10,487,738 | B2 | 11/2019 | Versaevel et al. |
| 12,092,026 | B2 * | 9/2024 | Digeos ............... F02C 7/047 |
| 2008/0179448 | A1 | 7/2008 | Layland et al. |
| 2011/0011056 | A1 | 1/2011 | Le Docte |
| 2011/0155855 | A1 | 6/2011 | Caruel |
| 2015/0210400 | A1 | 7/2015 | Gonidec et al. |
| 2016/0305321 | A1 | 10/2016 | Pujar et al. |
| 2018/0178917 | A1 | 6/2018 | Ravise et al. |
| 2018/0215476 | A1 | 8/2018 | Chee et al. |
| 2020/0140097 | A1 | 5/2020 | Slane et al. |
| 2022/0042456 | A1 | 2/2022 | Digeos et al. |

FOREIGN PATENT DOCUMENTS

| | | |
|---|---|---|
| FR | 2935356 A1 | 3/2010 |
| FR | 2981049 A1 | 4/2013 |
| FR | 3023538 A1 | 1/2016 |
| FR | 3095420 A1 | 10/2020 |
| WO | 2021192599 A1 | 9/2021 |

OTHER PUBLICATIONS

International Search Report mailed Mar. 30, 2023, issued in corresponding International Application No. PCT/FR2022/052378, filed Dec. 15, 2022, 7 pages.

Written Opinion mailed Mar. 30, 2023, issued in corresponding International Application No. PCT/FR2022/052378, filed Dec. 15, 2022, 10 pages.

Von Torsten Vogel, UHR; "Forscher steigern Warmeleitfahigkeit von Graphen um 58%"; PCGH; Starseite/Neue Technologien; printed on Mar. 20, 2023; 3 pages (German only, no translation provided).

* cited by examiner

AIR INTAKE LIP FOR A NACELLE OF AN AIRCRAFT PROPULSION ASSEMBLY

CROSS-REFERENCE TO RELATED APPLICATIONS

This application is a National Stage of International Application No. PCT/FR2022/052378, filed Dec. 15, 2022, which claims priority to French Patent Application No. 2113772, filed Dec. 17, 2021, the entire disclosures of which are hereby incorporated by reference in their entirety for all purposes.

TECHNICAL FIELD OF THE INVENTION

The invention relates to the field of the propulsion assemblies, for example for aircraft, and more particularly to an air intake lip for a nacelle of such a propulsion assembly.

TECHNICAL BACKGROUND

The prior art may comprise in particular the documents US-A1-2018/178917, US-A1-2011/011056, US-A1-2015/210400, US-A1-2008/179448, FR-A1-2935356 and US-A1-2016/305321.

A propulsion assembly 1, in particular for an aircraft, comprises an engine of the turbomachine 2 type which is surrounded by a nacelle 3 (FIG. 1). If the turbomachine 2 is a dual-flow turbofan engine, the air flow passing through a sleeve of air intake 4 passes through a vane ring of a fan 32 and then divides into a primary air flow F1 which enters a hot portion of the turbomachine 2 and a secondary air flow F2 which flows into a cold portion of the turbomachine 2.

The nacelle 3 comprises the air intake sleeve 4, a middle structure 34 and a downstream structure 36, all interconnected so as to form a flow duct for an air flow 38. This duct 38 forms an inlet for an air flow F inside the nacelle 3. Once the air intake flow F has passed through the fan 32, it divides into the primary flow F1 and the secondary flow F2 in the turbomachine 2.

The intake sleeve 4 comprises an air intake lip 40 designed to allow the optimum capture of the air needed to supply the engine over its entire operating range, while minimising losses and drag.

Typically, the lip is annular and comprises an internal annular wall 44, an external annular wall 42 and an upstream annular wall 46 connecting the internal and external walls together so as to define an annular cavity 400 between them.

The air intake lip is known to be a point in the propulsion assembly that favours the accretion of ice or frost. The ice that forms on the intake lip may grow to a large size before breaking off, with the risk, when it eventually dislodges from the intake lip, of damaging the fan vanes that it strikes or another part of the turbomachine that ingests it. The ice or frost may also accumulate unevenly on the intake lip, causing undesirable vibrations in the propulsion assembly.

To overcome this problem, it has been proposed to install a de-icing (or anti-icing) device, the aim of which is to ensure that the ice or the frost on the walls of the lip of the intake sleeve is cleared before it reaches a critical size. With reference to FIGS. 2 and 3, a known de-icing device 5 of this type, presented in particular in the document FR-A1-3 095 420, comprises a circular tube 50 in the cavity 400 of the lip 40 which runs around the nacelle and which feeds hot air taken from the turbomachine into the annular cavity 400 in order to heat the walls of the lip. The circulation of hot air in contact with the lip allows to heat the walls of the lip to de-icing or prevent frost from forming on the air intake lip.

To reduce the acoustic emissions of the propulsion assembly, some of the interior walls of the nacelle are lined with sandwich-type acoustic panels 7. This acoustic panel 7 comprises a central web with honeycomb-shaped acoustic cells 72. The acoustic cells may be covered by a watertight rear skin, and by a front skin facing the sound source, which is perforated or porous. In FIGS. 2 and 3, the acoustic cells 72 are located between an external annular skin 74 and a portion of the internal wall 44 of the lip, which is perforated with holes 444.

The open acoustic cells then form a Helmholtz resonator-type device, which helps to significantly reduce the acoustic emissions.

This type of acoustic panels is fitted in particular to the internal walls of the secondary cold air annular duct, in the case of a dual-flow turbofan engine, and to the internal wall of the air intake lip. In particular, these panels form the acoustic part or parts forming all or part of the acoustic shell of the air intake, which are arranged in the annular cavity of the lip.

However, the installation of acoustic cells in the annular cavity of the lip isolates certain wall areas of the lip (for example, a wall area Z1 of the lip facing the acoustic panel), which may prevent this wall area from being heated, where there may be a risk of frost accumulation. To overcome this second problem, several systems are envisaged, such as:

- de-icing by channels, presented in particular in the document FR-A1-2 981 049, which proposes an alternation of acoustic cells and channels in which a fluid circulates allowing to heat the area of the wall insulated by the acoustic panel;
- "breathable" de-icing, presented in particular in the document FR-A1-3 023 538, which proposes an outlet (such as orifices 440 and/or holes 444 on the internal wall 44 of the lip 40) for the flow of hot air F3 in the secondary duct 38 in order to heat the surface of the wall 44 from the outside, above which the acoustic cells 72 are located (FIGS. 2-5);
- the de-icing by ventilation of the acoustic cells, presented in particular in the document FR-A1-2 752 392, wherein the acoustic cells each comprise air circulation holes with or without air outlet into the secondary duct.

However, the channel de-icing system may have several disadvantages, such as:

- the loss of acoustic efficiency due to the presence of circulation channels between the acoustic cells,
- the difficulty of assembly (matching between the channels, positioning of the acoustic bores, passage of the channels between the cells, etc.), and
- placing a system for supplying the channels may be more bulky and costly.

The limits of the breathable de-icing system may be:

- the acoustic area is limited between the air flow separation point upstream of the acoustic area and the front frame, and
- the discharge of hot air F3 into the engine air flow (in particular into the secondary cold air duct 38, as shown in FIGS. 4 and 5), which may affect the nominal operation of the engine and its elements.

The disadvantage of the system for de-icing the acoustic cells by ventilation is that the circulation of air in the cells may not be effective over the entire acoustic panel, in particular due to the presence of confined areas.

In these different contexts, it is interesting to propose a solution that allows to overcome the disadvantages of the prior art, in particular by improving the thermal conduction of an air intake lip, in order to reduce the energy required for its de-icing.

More specifically, in the case of the breathable de-icing system, it is interesting to propose an air intake lip that allows, in particular, to limit the discharge of hot air into a secondary flow duct (with cold air) of a turbomachine of a propulsion assembly.

SUMMARY OF THE INVENTION

The present invention thus proposes an annular lip for a nacelle of an aircraft propulsion assembly, the lip extending around an axis of revolution X and which comprises:
- an external annular wall,
- an internal annular wall,
- an upstream annular wall connecting said external and internal annular walls so as to define an annular cavity between them.

According to the invention, at least a portion of the annular lip comprises at least one heat transfer coating which comprises an allotropic carbon material.

In the present application, "heat transfer coating" means a coating having the function (or capacity) of exchanging heat, in particular this heat being directed from one or more hottest elements (for example, a flow of hot air from a de-icing or anti-defrosting device) towards one or more coldest elements (for example, the walls of the lip containing the frost) in order to heat this or these cold elements. To achieve this, the coating is made from one or more materials with thermal properties that promote the heat transfer. By way of example, the coating according to the invention has optimum thermal properties when they are greater than the thermal properties of the annular lip and/or the acoustic panel making up the air intake lip. For example, the thermal properties are characterised by the thermal conductivity of the materials forming the heat transfer coating, the annular lip and the acoustic panel.

By "allotropic carbon" we mean a material comprising carbon in its allotropic forms so as to have different physical properties (e.g. thermal conductivity, melting point, hardness, etc.) and a chemical reactivity, although the allotropic forms are made up of identical atoms. By way of example, the allotropic carbon may take the following two most common forms:
- graphene, which is a two-dimensional crystal of carbon atoms regularly distributed in a hexagonal honeycomb pattern, and
- diamond, which has a hard transparent crystalline form with each carbon atom surrounded by four single bonds in a tetrahedral arrangement.

Thereby, the heat transfer coating made from allotropic carbon has a high thermal conductivity, particularly compared with that of the lip made from metal (such as aluminium or titanium). This allotropic carbon coating therefore allows to improve both conductive and radiative heat transfer from the cavity of the lip towards the walls of the lip, and in particular from the cavity towards the walls of an annular acoustic panel when it is placed on the internal wall to heat the area of the lip below this acoustic panel by radiation. This is because the heat from the cavity of the lip propagates through the allotropic carbon coating and the wall or the walls of the lip, so as to enhance an almost total absorption of this heat to warm the corresponding wall or walls. As a result, the presence or the formation of frost (or ice) on the walls of the lip (and generally on the air intake lip of a nacelle) is avoided.

Improving the thermal conduction of the lip also allows to reduce the energy required for the de-icing or the anti-icing. In particular, when the energy is taken up from the turbomachine to supply the air intake lip with hot air in order to de-ice (or prevent the formation of frost) the walls of the intake lip.

In addition, the intake lip in the configuration described in the invention allows to limit (or even eliminate) the discharge of hot air (which is required to de-ice the external surface of the internal wall of the lip, in particular the area of the internal wall facing an acoustic panel when the lip is equipped with one) into an air flow duct of a turbomachine. This is because the flow of hot air rejected from the lip is compensated by the heat transfers in the area or the areas of the lip comprising the allotropic carbon coating.

The invention therefore has the advantage of being based on a simple design, offering a very high reliability and low cost and overall dimension.

The air intake lip according to the invention may comprise one or more of the following characteristics, taken alone or in combination with each other:
- said at least one heat transfer coating is located on one or more portions of a surface of the annular lip;
- at least a portion of the external annular wall and/or the internal annular wall comprises said at least one heat transfer coating;
- the lip further comprises at least one annular acoustic panel located in said cavity and extending around the internal wall, this internal wall being perforated and comprising holes opening into acoustic cells of the acoustic panel;
- the acoustic panel comprises at least one annular skin which envelops the acoustic cells, wherein at least a portion of said at least one skin and/or at least a portion of the acoustic cells comprise said at least one heat transfer coating;
- the annular skin comprises an upstream end which is attached to at least one of the internal and upstream annular walls; at least a portion of said upstream end and/or at least a portion of said at least one of the internal and upstream annular walls comprises said at least one heat transfer coating;
- the external and internal annular walls of the lip are also interconnected by a downstream annular wall, and wherein the annular skin comprises a downstream end which is attached to the downstream annular wall; at least a portion of this downstream annular wall and/or at least a portion of the downstream end comprising said heat transfer coating;
- the lip comprises at least one first area facing the acoustic panel and/or at least second and third areas adjacent to the acoustic panel, wherein said at least one annular heat transfer coating covers at least one of said areas;
- the acoustic panel is made of a metal alloy, composite or thermoplastic;
- the allotropic carbon material is graphene;
- said at least one heat transfer coating has a thickness of less than 40 µm, for example the thickness is between 1.0 µm and 40 µm;
- the lip comprises a de-icing device which is of the pneumatic or electric type and which is at least partly housed in said cavity;
- -the pneumatic de-icing device is configured to emit a flow of hot air, said internal annular wall comprising through orifices which are distributed around said axis X and which are configured to allow said flow of hot air to pass outside said cavity;

said at least one heat transfer coating is annular, said at least one heat transfer coating is formed of a plurality of sectors connected circumferentially (with respect to the axis X) end to end, said at least one heat transfer coating covers all or at least a portion of an external surface and/or an internal surface of the internal annular wall of the lip, said at least one heat transfer coating covers all or at least a portion of an external surface and/or an internal surface of the external annular wall of the lip, said at least one heat transfer coating covers all or at least a portion of an upstream surface and/or a downstream surface of the upstream annular wall of the lip, said at least one heat transfer coating covers all or at least a portion of an upstream surface and/or a downstream surface of the downstream annular wall of the lip, said at least one heat transfer coating covers all or at least a portion of an external surface and/or an internal surface of said at least one annular skin of the acoustic panel, all or at least a portion of the acoustic cells are coated with said at least one heat transfer coating, the graphene has a thermal conductivity of up to 5000 W·m$^{-1}$·K$^{-1}$, for example the thermal conductivity is between 800 and 5000 W·m$^{-1}$·K$^{-1}$.

The invention also relates to an air intake sleeve for a nacelle of an aircraft propulsion assembly, said sleeve comprising an annular air intake lip as described above.

The invention also relates to a propulsion assembly, in particular for an aircraft, comprising a nacelle equipped with an air intake lip as described above or an air intake sleeve-lip as described above.

The invention also relates to an aircraft comprising a fuselage, at least one lift wing and at least one propulsion assembly attached to the fuselage or mounted under the lift wing. The propulsion assembly comprises a nacelle equipped with an air intake lip as described above or an air intake sleeve as described above.

The present invention also relates to a method for manufacturing an air intake lip according to one of the particularities of the invention. The method comprises the steps of:

producing an annular lip formed from all or part of at least one of the external, internal and upstream annular walls, applying at least one heat transfer coating to the lip.

The method according to the invention may comprise one or more of the following characteristics, taken alone or in combination with each other:

said heat transfer coating may be applied by anodising sealing, surface treatment (e.g. in a bath), bonding, spraying or applying a doped coating;

the method according to the invention further comprises the steps of:

producing at least one acoustic panel comprising acoustic cells, assembling the at least one acoustic panel with the formed annular lip, so that the acoustic cells open into perforated holes in the internal annular wall of the lip;

the method comprises applying said heat transfer coating to all or at least a portion of at least one of the annular walls of the lip;

the method comprises applying said heat transfer coating to at least a portion of the acoustic cells and/or to at least a portion of at least one annular skin enveloping said acoustic cells;

the heat transfer coating covers one or more parts of the cavity so as to heat the area subject to the frost which are isolated from the heat source.

BRIEF DESCRIPTION OF THE FIGURES

The invention will be better understood and other details, characteristics and advantages of the present invention will become clearer from the following description made by way of non-limiting example and with reference to the attached drawings, in which.

The elements having the same functions in the different embodiments have the same references in the figures.

DETAILED DESCRIPTION OF THE INVENTION

By convention, in the following description, the terms "longitudinal" and "axial" refer to the orientation of structural elements extending in the direction of a longitudinal axis, such as a longitudinal axis of the engine of a turbomachine of an aircraft propulsion assembly. The terms "radial" or "vertical" refer to an orientation of structural elements extending along a direction perpendicular to the longitudinal axis. The terms "inner" and "outer", and "internal" and "external" are used in reference to a positioning with respect to the longitudinal axis. Thus, a structural element extending along the longitudinal axis comprises an inner surface facing towards the longitudinal axis and an outer surface opposite its inner surface.

Similarly, the terms "upstream" and "downstream" are defined in relation to the direction of circulation of air in the turbomachine.

Figure 1:
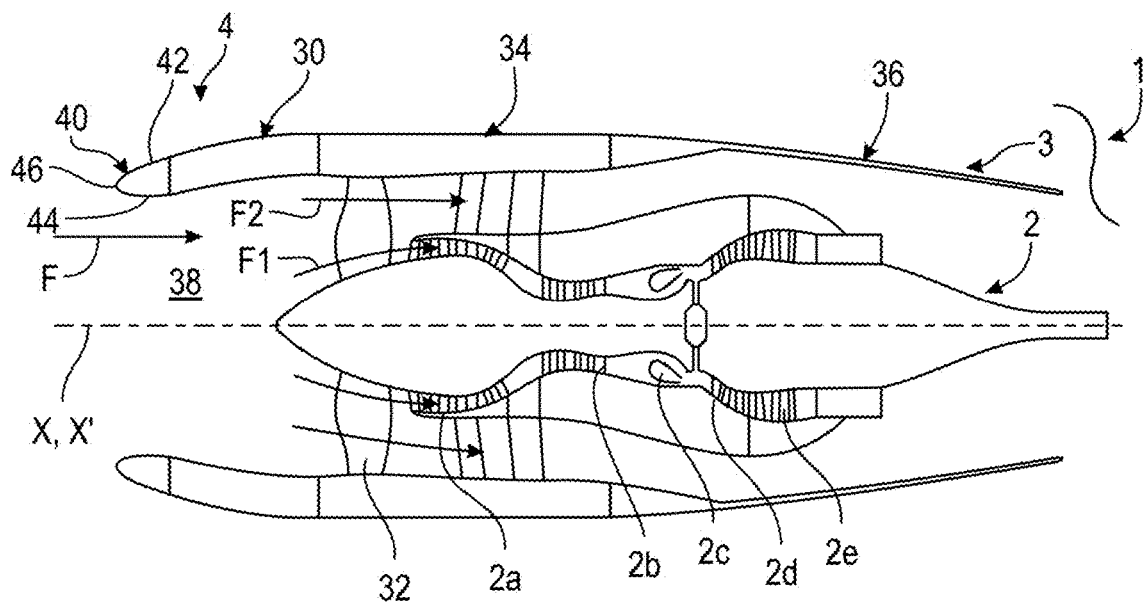
FIG. 1 is a schematic axial sectional view of an aircraft propulsion assembly.
Figure 2:
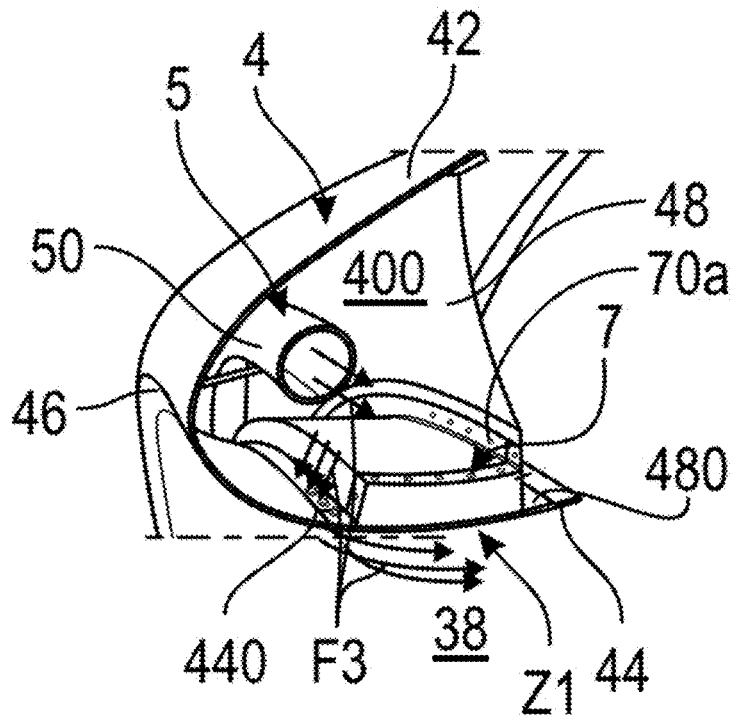
FIG. 2 shows schematically a partial half perspective view of an air intake lip of the prior art.
Figure 3:
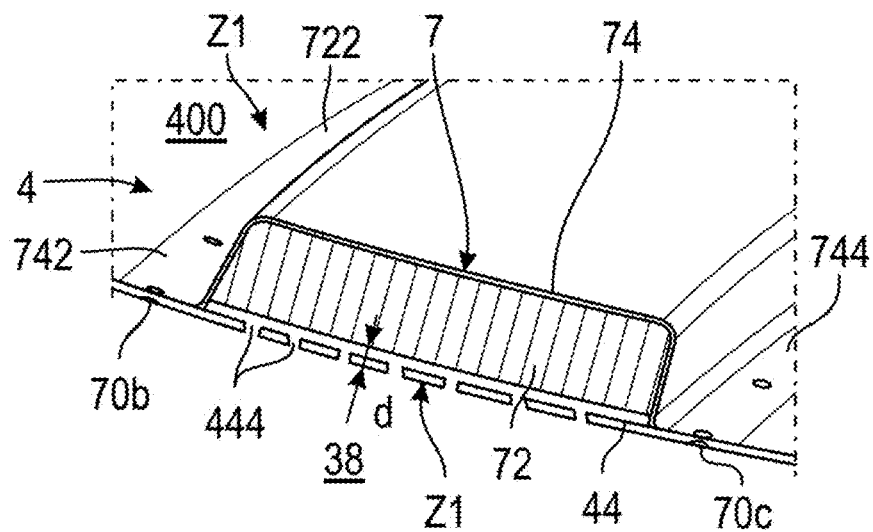
FIG. 3 shows schematically an enlarged schematic view at the level of an acoustic panel of the intake lip of the FIG. 2.
Figure 4:
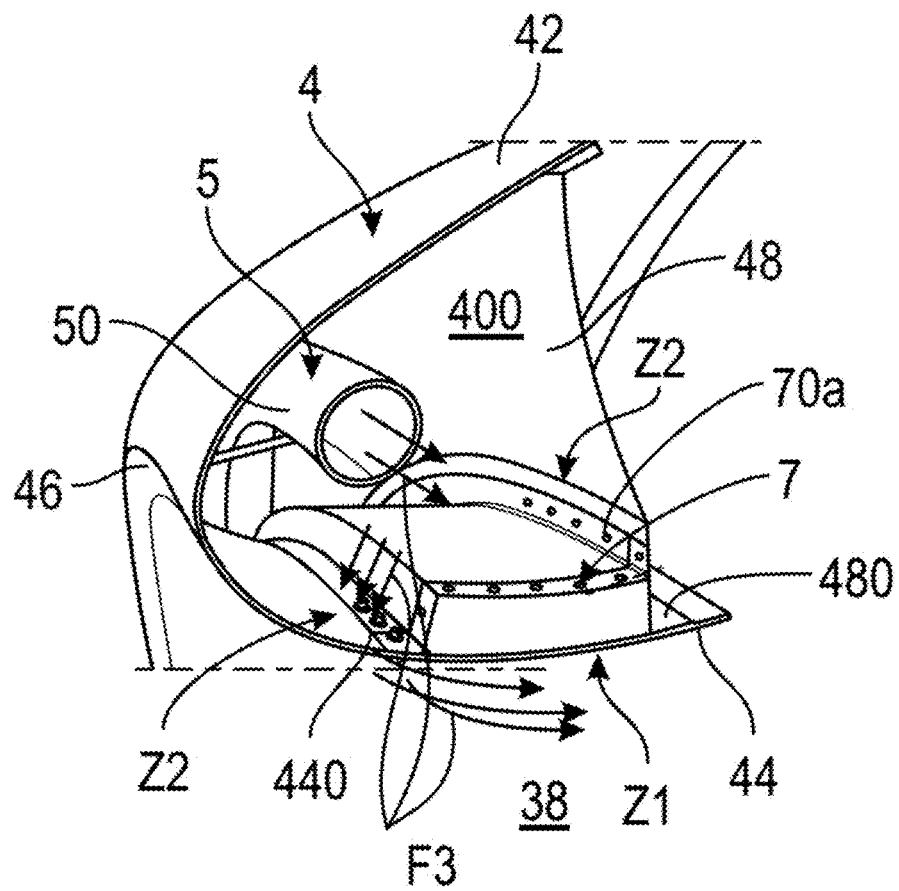
FIG. 4 shows schematically a partial half view of a hot air flow being discharged from the air intake lip in FIG. 2.

FIGS. 1 to 3 have been described above.

The invention applies to a propulsion assembly, in particular for an aircraft, as shown in FIG. 1.

As described above, the propulsion assembly 1 comprises an engine or a turbomachine 2 which is surrounded by a nacelle 3.

This propulsion assembly 1 may be attached to an aircraft fuselage or mounted under an aircraft lift wing (not shown in the figures).

The turbomachine 2 may be a dual-flow turbofan engine, as shown in FIG. 1. The turbomachine 2 extends along a longitudinal axis X' and comprises, from upstream to downstream in the direction of gas flow, a fan 32, a low-pressure (LP) compressor 2a, a high-pressure (HP) compressor 2b, an annular combustion chamber 2c, a high-pressure (HP) turbine 2d and a low-pressure (LP) turbine 2e, which define a flow duct for a primary gas flow F1.

The rotor of the HP turbine 2*d* is secured to the rotor of the HP compressor 2*b* so as to form a high-pressure body, while the rotor of the LP turbine 2*e* is secured to the rotor of the LP compressor 2*a* so as to form a low-pressure body. The rotor of each turbine drives in rotation the rotor of the associated compressor about the axis X' under the effect of the thrust of the gases coming from the combustion chamber 2*c*.

The nacelle 3 of the propulsion assembly 1 comprises, from upstream towards downstream, an air intake sleeve 4, a middle structure 34 and a downstream structure 36 interconnected so as to extend around the turbomachine 2 and define around it an annular flow duct 38 for an inlet flow F. After the inlet flow F passes through the fan 32, it divides into a primary flow F1 and a secondary flow F2 in the turbomachine 2.

The air intake sleeve 4 may comprise an annular air intake lip 40 and an annular body 30 arranged downstream of the lip 40. The lip 40 and the body 30 extend along an axis of revolution X coincident with the axis X' of the turbomachine 2.

In the example, the lip 40 and the body 30 are formed in one-part. Alternatively, the lip 40 and the body 30 may be formed from two separate parts with the lip 40 adjoined or attached to the body 30.

The lip 40 is adapted to allow the optimum capture of the air needed to supply the fan 32 of the turbomachine 2. This air then divides to form the aforementioned primary F1 and secondary F2 flow.

The lip 40 allows to form a leading edge of the air intake sleeve 4 and defines a transverse inlet of the nacelle 3 allowing air to enter the nacelle. This transverse inlet continues into the duct 38. This lip 40 comprises two annular walls, an internal wall 44 and an external wall 42. In particular, these walls 42, 44 are coaxial with the axis X.

The internal wall 44 defines a portion of an internal annular surface 44*b* of the air intake lip 40, allowing the air flows to be captured and guided towards the fan 32. The internal wall 44 may thus form part of the annular duct 38 of the nacelle. On the other hand, the external wall 42 defines a portion of an external annular surface 42*a* of the air intake lip 40.

The lip 40 also comprises an upstream annular wall 46 which connects the internal 44 and external 42 walls together. In the examples, the upstream wall 46 is ogive-shaped. The internal, external and upstream walls may be formed in one-part (i.e. integrally). The internal 44, external 42 and upstream 46 walls define an annular cavity 400 between them.

Figure 8:
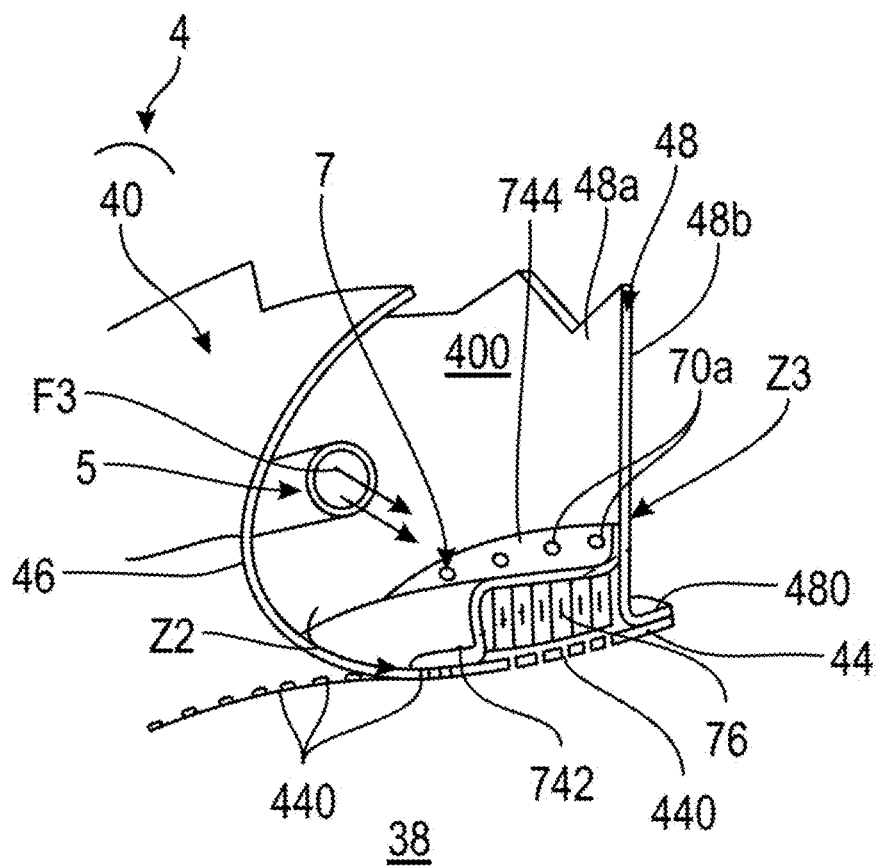
FIG. 8 is a partial schematic perspective view of an air intake lip according to a second mode of the invention, comprising an acoustic panel.
Figure 9:
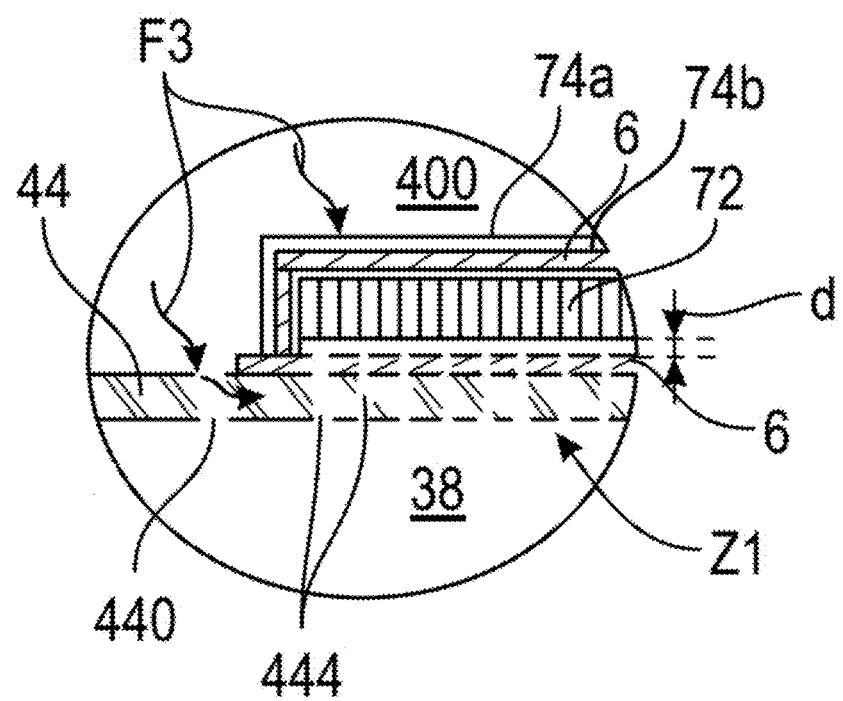
FIG. 9 is a schematic enlarged view of a portion of the acoustic panel of FIG. 8.

Downstream of the lip 40, the internal 44 and external 42 walls may be interconnected by a downstream annular wall 48 which is in particular opposite the upstream annular wall 46. In this configuration, the cavity 400 extends axially between the upstream wall 46 and the downstream wall 48. In the example shown in FIGS. 8 and 9, a radially internal end of the downstream wall 48 comprises an attachment flange 480. This flange 480 may be connected to the internal wall 44. As shown in FIGS. 8 and 9, the flange 480 and the downstream wall 48 are formed in one-part.

Generally speaking, the annular walls 42, 44, 46 and 48 of the lip 40 may each be made of metal, alloy or composite.

Figure 5:
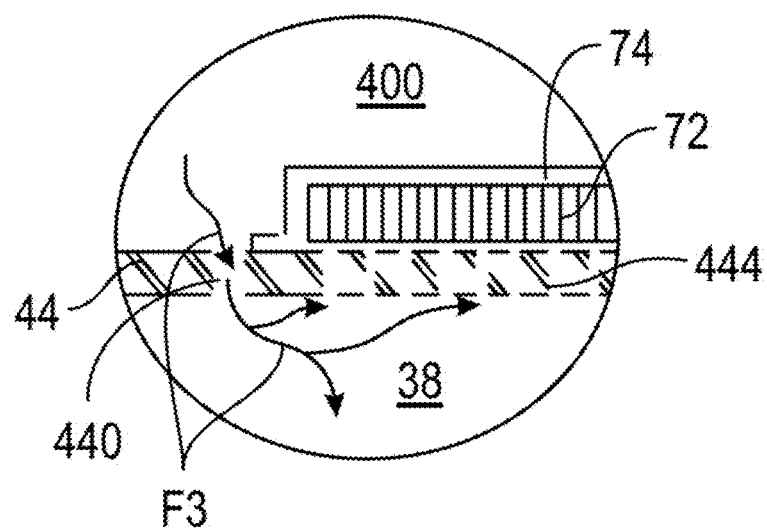
FIG. 5 shows schematically an enlarged view of the hot air flow being discharged of FIG. 4.
Figure 6:
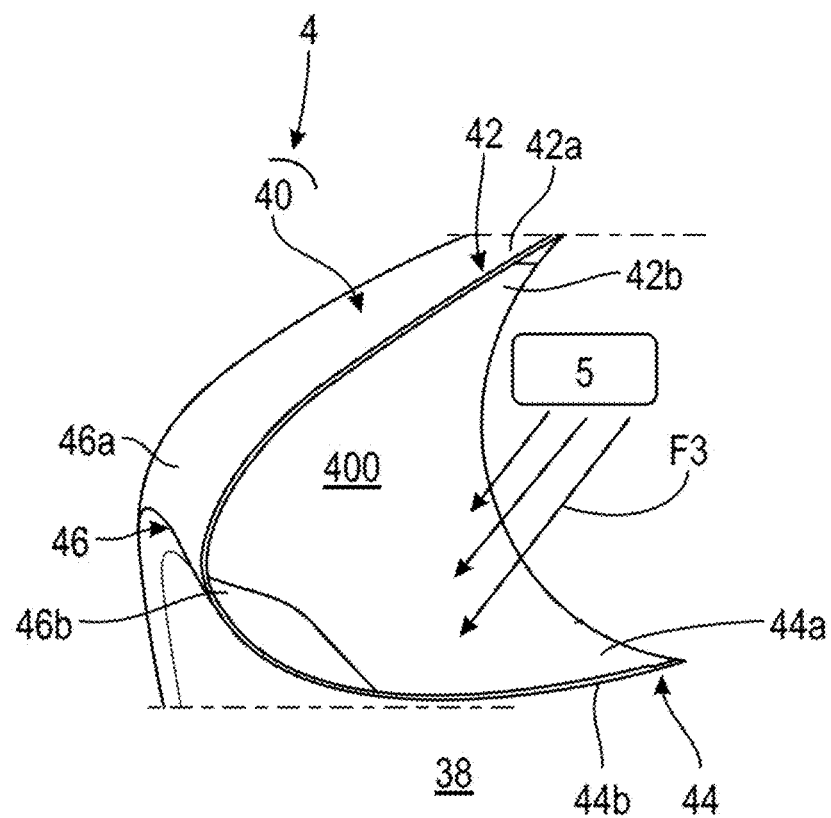
FIG. 6 is a schematic partial perspective view of an air intake lip according to a first mode of the invention.
Figure 7:
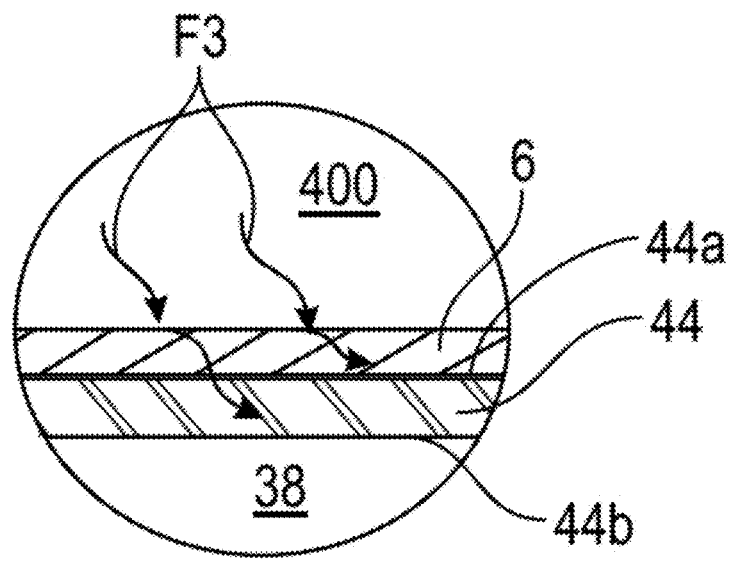
FIG. 7 is a schematic enlarged view of an internal wall of the intake lip of FIG. 6.

As described in the technical background of the present application, the intake lip 40 may comprise at least one de-icing (or anti-icing) device 5 which delivers a flow of hot air F3 allowing the wall or walls of the intake lip 40 to be heated in order to de-ice the corresponding wall or walls. This de-icing device 5 may be pneumatic or electric. At least a portion of the de-icing device 5, in particular a circular tube 50 of the pneumatic de-icing device with reference to FIGS. 8 and 9, may be located in the cavity 400 of the lip (FIG. 5) or in another compartment of the nacelle 3 (FIGS. 6 and 7).

Through orifices 440, for example forming an annular row of through orifices, may be distributed around an annular periphery of the internal wall 44 (FIGS. 8 and 9). In the previous prior art, in particular with reference to "breathable" de-icing, these through orifices allowed the flow of hot air F3 to pass out of the lip 40 to heat the internal surface 44*b* of the internal wall 44 which was not properly de-iced.

The lip 40, in particular the cavity 400, may also comprise at least one acoustic panel 7, as shown in FIGS. 8 and 9. The acoustic panel 7 may be annular or may comprise several sectors connected circumferentially end to end with respect to the axis X. The acoustic panel 7 comprises acoustic cells 72. These acoustic cells 72 may be honeycomb-shaped. In the example shown in FIGS. 8 and 9, the acoustic cells 72 extend around the internal wall 44 of the lip. In this case, the internal wall 44 may comprise holes 444 opening into the acoustic cells 72. This acoustic panel 7, together with the acoustic cells 72 referred to as open acoustic cells, may form a Helmholtz resonator-type device that helps to significantly reduce the acoustic emissions.

With reference to FIGS. 8 and 9, the acoustic panel 7 comprises an annular skin 74 which envelops the acoustic cells 72. This skin 74 extends radially outwards (relative to the axis X). The skin 74 allows to form a tight wall around the acoustic cells 72.

With reference to FIG. 2 or 8, an upstream end 742 of the annular skin 74 may be connected to the internal wall 44, in particular by attachments 70*b*. A downstream end 744 of the annular skin 74 may be connected to the internal wall 44 (FIGS. 2 and 3) or to the downstream wall 48 (FIGS. 8 and 9), in particular by attachments 70*a*, 70*c*.

Alternatively, not shown in the figures, the acoustic cells 72 may extend around another annular skin, referred to as the internal skin, which is perforated or porous. This internal skin extends around the internal wall 44 of the lip.

The acoustic panel 7, in particular the acoustic cells 72, may be spaced from the internal wall 44 by a distance d (FIGS. 2 and 8), so that the acoustic cells 72 are not in contact with the internal wall 44 while still guaranteeing an acoustic attenuation function. For example, the distance d is less than 3.00 mm.

Generally speaking, the acoustic panel 7 (i.e. the acoustic cells 72 and/or the annular skin 74) may be made of a metal, metal alloy, composite or thermoplastic material.

As described in the technical background to this application, placing the acoustic panel 7 in the cavity 400 of the lip isolates a certain wall area of the lip. In particular, a first area Z1 of the wall of the lip faces the acoustic panel 7 (as shown in FIGS. 8 and 9). This area Z1 is not heated by the flow of warm air F3, which may present a risk of greater frost accumulation.

One of the particularities of the invention is that at least a portion of the lip 40 comprises at least one heat transfer coating 6. This coating 6 comprises an allotropic carbon material. This allows to improve the thermal conduction of the lip to effectively heat the wall or the walls of the lip and/or prevent the formation of frost on these walls.

The heat transfer coating 6 may comprise a maximum thermal conductivity of up to approximately 5000 $W \cdot m^{-1} \cdot K^{-1}$. For example, the coating 6 is made of graphene. The graphene has a thermal conductivity of up to 5000 $W \cdot m^{-}$ 1·K$^{-1}$. The graphene may have a thermal conductivity of between 800 and 5000 W·m$^{-1}$·K$^{-1}$.

Preferably, the thermal conductivity of the heat transfer coating 6 is greater than the thermal conductivity of the acoustic panel 7 or that of the walls 42, 44, 46, 48 of the lip 40. For example, the acoustic panel 7 may be made of aluminium or titanium. The thermal conductivity of aluminium is approximately 125 W·m$^{-1}$·K$^{-1}$, and that of titanium is approximately 7.3 W·m$^{-1}$·K$^{-1}$.

The allotropic carbon coating 6 may be annular in shape or may be formed of several sectors connected circumferentially (with respect to the axis X) end to end. The coating 6 may be applied to the lip, which has an annular or sector shape. The coating 6 may be applied to the connecting battens of the sectors of the part to be coated.

The heat transfer coating 6 may have a minimum thickness. This thickness is measured radially with respect to the axis X. The thickness of the coating 6 may be less than 10 µm when the allotropic carbon is applied by sealing. The thickness of the coating 6 may be less than 40 µm when the carbon is incorporated in an organic coating (such as a paint). The thickness of the coating 6 may be less than or equal to a few nanometres when it is applied to the surface alone. Advantageously, the thickness of the coating 6 is between 1.0 µm and 40 µm.

The heat transfer coating 6 may be applied to the entire surface of the lip or to at least one or more localised surface portions of the lip. The heat transfer coating 6 may directly cover the surface portion or portions of the lip (for example requiring to be heated by the hot air flow F3). For example, the coating 6 may have a minimum surface area of approximately 100cm$^2$.

Advantageously, the heat transfer coating 6 may cover one or more parts of the cavity to warm the area that is not exposed to hot air convection.

Advantageously, the coating 6 may cover all or at least a portion of the walls of the lip that need to be heated to prevent frost, such as the internal wall 44, the external wall 42, the upstream wall 46 and/or the downstream wall 48. The flange 480 of the downstream wall 48 may comprise the allotropic carbon coating 6.

The coating 6 may cover all or at least a portion of the skin 74 and/or the acoustic cells 72 of the acoustic panel 7.

"Whole surface" means 100% allotropic carbon coating coverage (or a proportion) of the total surface area of the part to be coated. In particular, this total surface area corresponds to at least one of the internal, external, upstream and downstream surfaces of at least one or more of the walls 42, 44, 46, 48 of the lip and/or of the acoustic panel 7.

"A portion of the surface" means a coverage of the allotropic carbon coating of between 10 and 90% of the total surface of the part to be coated. Preferably, this coverage is between 30 and 70% of the total surface area. In particular, this total surface area corresponds to at least one of the internal, external, upstream and downstream surfaces of at least one or more of the walls of the lip and/or of the acoustic panel.

Generally speaking, the dimensions (i.e. shape, thickness, surface area, proportion, etc.) of the allotropic carbon heat transfer coating may vary depending on its location in the lip, the arrangement of the elements in the lip and the dimensions of the lip and of the nacelle.

Generally speaking, one or more layers of the allotropic carbon coating 6 may cover one part or a combination of at least two parts selected from: the internal wall 44, the external wall 42, the upstream wall 46, the downstream wall 48, the flange 480, the skin 74 and the acoustic cells 72.

Not all possible configurations for covering the elements of the lip 40 with the heat transfer coating 6 are illustrated in the figures, and this application is not limited to the embodiments illustrated in FIGS. 6 to 9.

We will now describe, in a non-limiting way, the arrangement of the allotropic carbon heat transfer coating 6 in the lip 40 with reference to FIGS. 6 to 9.

FIGS. 6 and 7 illustrates a first embodiment of the intake lip 40 of the invention, comprising the lip 40 as described above (with the internal wall 44, external wall 42 and upstream wall 46 delimiting the cavity 400) and an allotropic carbon heat transfer coating 6 as described above. In this example, the allotropic carbon coating 6 covers an external surface 44a of the internal wall 44. The external surface 44a forms part of the cavity 400 of the lip. Alternatively, the coating 6 covers the internal surface 44b opposite the external surface 44a. This internal surface 44b extends into the duct 38 of the nacelle 3.

In the example shown in FIGS. 6 and 7, the flow of hot air F3 (for example delivered by the de-icing device 5) is absorbed by the heat transfer coating 6 and diffused into the internal wall 44 to heat it. In this configuration, almost all the hot air flow F3 is diffused into the coating 6 and the internal wall 44. As a result, little or none of the hot air flow F3 escapes from the lip 40 into the duct 38. If this occurs, the small quantity of hot air flow F3 entering the duct 38 does not disturb the flow of cold air in the turbomachine.

Alternatively, not shown in the figures, the allotropic carbon coating 6 may cover all or at least a portion of an upstream surface 46a and/or a downstream surface 46b of the upstream wall 46. The downstream surface 46b extends into the cavity 400 and the upstream surface 46a is opposite the downstream surface 46a.

In another variant not shown in the figures, the allotropic carbon coating 6 may cover all or at least a portion of the external surface 42a and/or an internal surface 42b of the external wall 42. The internal surface 42b extends into the cavity 400, and the external surface 42a is opposite the internal surface 42b.

In another embodiment, the allotropic carbon coating 6 may cover all or at least a portion of an upstream surface 48a and/or a downstream surface 48b of the downstream wall 48. The upstream surface 48a extends into the cavity 400 and the downstream surface 48b is opposite the upstream surface 48a. A portion or all of the flange 480 of the downstream wall 48 may be covered by the coating 6.

Applying the coating 6 to at least one of the walls 42, 44, 46, 48 of the lip in FIGS. 8 and 9 allows to increase the transfer for de-icing. This reduces the need for energy input for de-icing and also reduces the amount of energy required from the engine of the turbomachine.

FIGS. 8 and 9 illustrates a second embodiment of the lip 40 as described above (with the internal 44, external 42, upstream 46 and downstream 48 walls defining the cavity 400 between them), the acoustic panel 7 described above and an allotropic carbon heat transfer coating 6 described above. In this example, and by no means restrictively, a portion of the external surface 44a of the internal wall 44 and the whole of an internal surface 74b of the skin 74 are covered by the allotropic carbon coating 6. The internal surface 74b extends towards the acoustic cells 72. Alternatively, not shown in FIGS. 8 and 9, the coating 6 covers an external surface 74a opposite the external surface 74a and/or the internal surface 44b of the internal wall 44 facing the acoustic panel 7. This external surface 74a extends towards the cavity 400 of the lip.

In particular, the upstream end 742 and/or the downstream end 744 of the skin 74 comprises the coating 6.

In the example shown in FIGS. 8 and 9, the flow of hot air F3 (delivered by the de-icing device 5, for example) is absorbed by the coating 6 and diffused into the internal wall 44 and into the skin 74, and is also absorbed directly by the skin 74. This allows to heat up the wall area Z1. In this configuration, almost all the hot air flow F3 is diffused into the coating 6, the skin 74 of the acoustic panel 7 and the internal wall 44 of the lip. As a result, little or none of the hot air flow F3 escapes from the lip 40. The flow of hot air F3 that may pass through the orifices 440 (if the internal wall 44 is equipped with them) into the duct 38 is sufficiently small that it does not disturb the flow of air flow in the turbomachine.

Alternatively, not shown in FIGS. 8 and 9, the allotropic carbon coating 6 may cover a second area Z2 and/or a third area Z3 adjacent to the acoustic panel 7. The second area Z2 may be located on a portion of the internal wall 44 which is adjoined to the acoustic panel 7. The third area Z3 may be located on a portion of the downstream wall 48 which is adjoined to the acoustic panel 7. The coating 6 may cover the internal surface and/or the external surface of the second area Z2 and/or of the third area Z3. The coating 6 may cover both the upstream surface 48a and the downstream surface 48b of the downstream wall 48 of the third area Z2.

The air intake lip 40 according to the invention is particularly advantageous in terms of manufacturing method. Such a method for manufacturing the intake lip 40 comprises the steps of:
producing the annular lip 40 which is formed from all or part of at least one of the external 42, internal 44 and upstream 46 annular walls,
applying at least one heat transfer coating 6 to the lip 40.
The coating 6 may be applied to all or at least a portion of at least one of the walls 42, 44, 46, 48 of the lip.

When the lip 40 to be produced is to be equipped with an acoustic panel 7, the manufacturing method may also comprise the steps of:
also producing at least one acoustic panel 7 comprising acoustic cells 72,
assembling the acoustic panel 7 with the formed lip 40, so that the acoustic cells 72 open into perforated holes 444 in the internal wall 44 of the lip 40.

The coating 6 may be applied to all or at least a portion of the annular skin 74 and/or to at least a portion of the acoustic cells 72.

The heat transfer coating 6 may be applied in the lip 40 by different surface coating techniques, such as:
sealing by anodising the part to be coated with allotropic carbon,
treating by immersion or dipping the part to be coated in a bath comprising allotropic carbon,
surface treating the part to be coated in a bath comprising allotropic carbon,
bonding,
applying the allotropic carbon directly or by means of spray paint to the part to be coated, or
applying the doped (or allotropic carbon-loaded) coating to the part to be coated.

By "part to be coated" we mean a part or a combination of at least two parts chosen from: the internal wall 44, the external wall 42, the upstream wall 46, the downstream wall 48, the skin 74 and the acoustic cells 72.

Allotropic carbon (such as graphene) may also be incorporated directly into the material used to make the part to be coated, particularly when the part to be coated is made from a composite or thermoplastic. The heat transfer coating 6 according to the invention may be additionally applied to this part.

The invention claimed is:

1. An annular lip of an air intake for a nacelle of an aircraft propulsion assembly, the annular lip extending around an axis of revolution and comprising:
an external annular wall;
an internal annular wall;
an upstream annular wall connecting the external and internal annular walls; and
an annular cavity delimited by the external annular wall, the internal annular wall, and the upstream annular wall,
wherein at least a portion of the annular lip comprises at least one heat transfer coating which includes an allotropic carbon material, the allotropic carbon material being graphene,
wherein the at least one heat transfer coating is located on one or more portions of a surface of the annular lip,
wherein the at least one heat transfer coating covers one or more parts of the annular cavity to heat an area or areas subject to frost which are isolated from a heat source,
wherein the at least one heat transfer coating is on an internal surface of the annular cavity and on the area or areas not directly exposed to the hot source, and
wherein the at least one heat transfer coating is configured to absorb hot air flow of the hot source, the absorbed hot air flow configured to be diffused into, and thereby transfer heat to, the internal surface of the annular cavity and the area or areas subject to frost.

2. The annular lip of claim 1, wherein at least a portion of the external annular wall and/or the internal annular wall comprises the at least one heat transfer coating.

3. The annular lip of claim 1 further comprising at least one annular acoustic panel which is located in the cavity and which extends around the internal wall, wherein the internal wall is perforated and includes holes opening into acoustic cells of the acoustic panel.

4. The annular lip of claim 3, wherein the annular acoustic panel comprises at least one annular skin which envelops the acoustic cells, wherein at least a portion of the at least one annular skin and/or at least a portion of the acoustic cells comprise the at least one heat transfer coating.

5. The annular lip of claim 4, wherein the at least one annular skin comprises an upstream end which is attached to at least one of the internal and upstream annular walls, and wherein at least a portion of the upstream end and/or at least a portion of the at least one of the internal and upstream annular walls includes the at least one heat transfer coating.

6. The annular lip of claim 4, wherein the external and internal annular walls of the lip are further interconnected by a downstream annular wall, wherein the at least one annular skin comprises a downstream end which is attached to the downstream annular wall, and wherein at least a portion of this downstream annular wall and/or at least a portion of the downstream end includes the at least one heat transfer coating.

7. The annular lip of claim 3, further comprising at least one first area facing the acoustic panel and/or at least second and third areas adjacent to the acoustic panel, wherein the at least one annular heat transfer coating covers at least one of the first, second, and/or third areas.

8. The annular lip of claim 3, wherein the acoustic panel comprises a metal alloy, a composite, or a thermoplastic.

9. The annular lip of claim 1, wherein the graphene has a thermal conductivity of up to 5000 $W \cdot m^{-1} \cdot K^{-1}$.

10. The annular lip of claim 1, wherein the at least one heat transfer coating has a thickness of less than 40 μm.

11. The annular lip of claim 1, further comprising a de-icing device which is of the pneumatic or electric type and which is at least partly housed in the annular cavity.

12. The annular lip of claim 11, wherein the pneumatic de-icing device is configured to emit a flow of hot air, and wherein the internal annular wall further comprises through orifices which are distributed around the axis and which are configured to allow the flow of hot air to pass outside the annular cavity.

13. An aircraft propulsion assembly, comprising a nacelle equipped with an annular lip of an air intake according to claim 1.

14. A method for manufacturing an annular lip of an air intake according to claim 1, wherein the method comprises the steps of:
   producing an annular lip formed from all or part of at least one of the external, internal, and upstream annular walls; and
   applying at least one heat transfer coating to the annular lip.

15. The method according to claim 14, wherein the at least one heat transfer coating covers one or more parts of the cavity to heat the area or areas subject to frost which are isolated from the heat source.

16. The method according to claim 14, wherein the at least one heat transfer coating is applied by anodizing sealing, surface treatment, bonding, spraying, or applying a doped coating.

17. The annular lip of claim 1, wherein the graphene has a thermal conductivity from 800 and 5000 $W \cdot m^{-1} \cdot K^{-1}$.

18. The annular lip of claim 1, wherein the at least one heat transfer coating has a thickness from 1.0 μm to 40 μm.

19. The annular lip of claim 1, wherein the at least one heat transfer coating is annular.

20. The annular lip of claim 1, wherein the at least one heat transfer coating is formed of a plurality of sectors connected circumferentially end to end with respect to the axis of revolution of the annular lip.

* * * * *